Patented Apr. 17, 1951

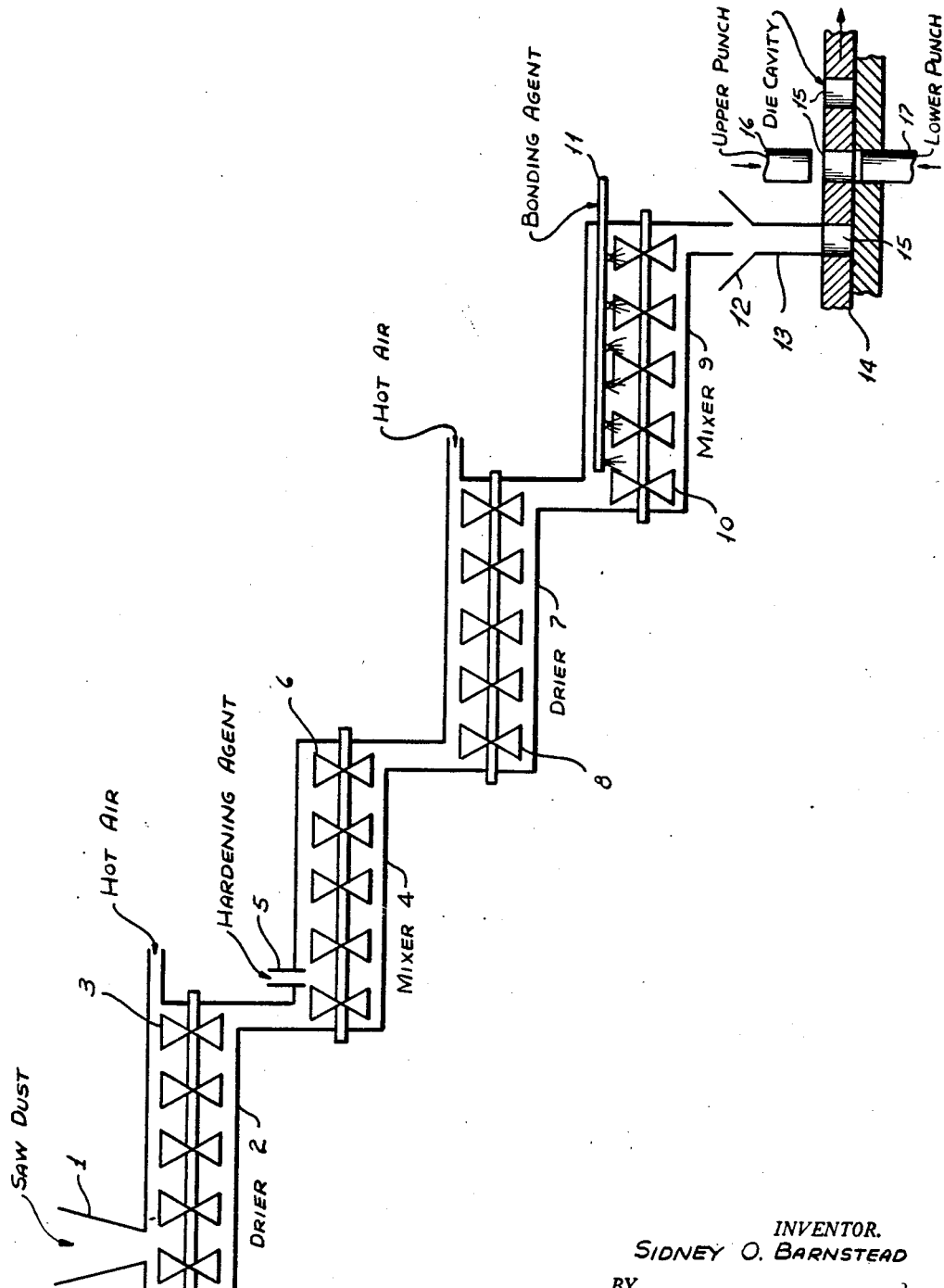

2,549,563

UNITED STATES PATENT OFFICE 2,549,563

MANUFACTURE OF MOLDED ARTICLES

Sidney O. Barnstead, Saco, Maine

Application April 17, 1948, Serial No. 21,585

1 Claim. (Cl. 18—47.5)

This invention relates to making molded articles such as bushings, spools, shoe heels, cores on which tape and paper ribbons are wrapped, coat hangers, tiles, and the like, by die molding sawdust under pressure.

If it is attempted to mold articles of raw sawdust (i. e., in its natural state), mixed with a binder by entering the mixture into a mold chamber and subjecting it to pressure, it will be found that the mixture must be compressed to reduce its volume to such extent that it becomes impossible to perform the molding operation with the rapidity requisite to commercial success, economic considerations making it necessary, and particularly with small articles of the kinds above mentioned, to mold them at a high rate, say in the order of 200 to 1,000 articles per minute. The necessity for greatly decreasing the volume of the sawdust and binder mixture is principally due to the porous nature and resiliency of the sawdust particles. Failure to reduce the volume sufficiently, results in the production of a porous molded article and one that tends to expand when the molding pressure is relieved, causing the article to crack in planes transverse to the direction in which the pressure was applied. Furthermore, neither sawdust alone, nor when mixed with a suitable binder, will flow readily enough to permit it to be rapidly entered into the mold chamber. This in itself, and aside from any other considerations, tends to slow up the molding operations to an extent where they become commercially impracticable.

According to the present invention, the sawdust, prior to incorporating it with the binder, is treated in such way as to overcome the above objections, making it possible to fill the mold chamber rapidly and secure proper bonding of the sawdust particles with a minimum of volumetric decrease of the mass during application of pressure thereto in the mold chamber. The present treatment also reduces the resiliency of the mass to such extent that, when the molding pressure is relieved, there will be substantially no tendency of the molded articles to expand and form the above mentioned cracks.

According to one way of practising this invention, wood or waste sawdust, preferably hard wood or hard wood sawdust, is sifted to make it of substantially uniform particle size. It has been found that a particle size corresponding to a 14 mesh screen will give satisfactory results in commercial practice. The particle size however is not critical and, in practice, may be that which corresponds to from a 14 to 50 or even 100 mesh screen. If desired, the raw sawdust may be ground and sifted to obtain the desired particle size.

If necessary the sawdust is dried in a suitable drier, this being desirable so as to secure a product of substantially uniform moisture content at this stage of the process. The residual amount of water in the sawdust is not critical, and conveniently may be approximately 5 to 10% by weight.

The sawdust is then agitated, in a mixing machine of any appropriate known kind, with a hardening agent. This mixing machine should be of such length that a uniform product is continuously delivered from such machine into a drier of known kind which agitates the treated mass and subjects it to a current of warm air for removing the water content of the mass and setting or solidifying the hardening agent, the operation preferably being such that the sawdust and solution are continually entered into the mixing machine and discharged into and from the drier so that a continuous operation is performed.

Various hardening agents may be employed, such as sodium silicate, sodium aluminate, sulphur chloride, or the like, but sodium silicate will hereinafter be referred to as illustrative.

The amount of sodium silicate with which the sawdust is treated, as above described, is such as to impregnate the sawdust particles with sodium silicate for hardening them, reducing their resiliency, increasing their specific gravity without making them brittle, and changing the sawdust from a fluffy mass of particles tending to adhere to each other to one consisting of discrete substantially smooth granules of sawdust particles. Hardening of the particles without making them brittle acts to secure a strong molded article. Reducing the resiliency of the particles makes it possible to mold the article with less volumetric decrease of the mass of particles during the die molding thereof. Increasing the specific gravity of the particles, and at the same time converting the sawdust to a granular mass, tends to make such mass flow easily and rapidly into the mold cavities, the drying of the treated sawdust reduces its water content, making the particles entirely non-tacky so as not to interfere with such flow.

The amount of sodium silicate with which the sawdust is treated may be varied within rather wide limits depending to some extent upon the character of the wood. With some woods the sawdust particles are more porous than with other woods, and consequently will take up more sodium silicate solution. In general best results will be secured when the sawdust is treated with sufficient sodium silicate solution to present from 30 to 60% anhydrous sodium silicate by weight in the final product. The amount of water present in the solution is not critical. Commonly best results will be secured with a solution consisting of from 20 to 40% anhydrous sodium silicate by weight with the balance water. The presence of more water than this in the solution is objectionable, for not only must the excess water be evaporated in the drier but it will cause the mass of sawdust in the mixing machine and drier to cake and be discharged from the drier in a "lumpy" condition instead of as a granular mass of non-tacky discrete sawdust particles.

I have hereinbefore referred to the grinding of the raw sawdust to the desired particle size. If desired, however, the grinding may be deferred until after the particles have been hardened. In this latter case they are preferably screened after grinding.

The dry, hardened sawdust may then be treated with a suitable bonding material, preparatory to entering it into the mold. Preferably this bonding material is applied in liquid state. A convenient way of applying it consists in passing the mass of particles through a worm conveyor which agitates the mass and, while being so passed and agitated, spraying it with a mist of the bonding material for coating the particles. In performing this operation the amount of bonding material applied should be sufficient to cause the hardened sawdust particles to be firmly bonded together immediately when a mass of such particles is subjected to pressure during the molding operation. A thin coating or pellicle of the bonding agent will serve these purposes very well.

The bonding material should not contain any more volatile substances, for example, water, alcohol or other solvent, than necessary, as an excess of any of such substances, will tend to cause cracking of the molded article upon evaporation of the volatile substances as such article stands and dries. A suitable bonding material consists of a water solution of phenolic aldehyde adhesive consisting of 50% of each. From 2 to 10% of such solution by weight with relation to the mass of silicate treated sawdust will give satisfactory results. Other suitable bonding materials may be used, for example, 2 to 6% of an alcoholic solution of shellac consisting of 4% shellac with the balance methyl alcohol, but with this adhesive it is desirable to partially evaporate the solvent in a heated drying section to prevent checking of the finished product. Also ordinary water solutions of 10 to 30% animal or vegetable glues, casein glue, and like adhesives commonly employed as bonding agents for granular materials may be employed. If desired, I may use urea aldehyde adhesives or low temperature furfurol resin adhesives which are thermo setting in character. Blood glue adhesive mixtures may be also used.

After the hardened sawdust is treated with the bonding material, it may be placed in or conveyed by an escalator to a hopper and fed by gravity to the mold cavities for producing the molded article. The type of mold employed is preferably that having upper and lower punches synchronized with an interposed die to produce the desired product. It is found that the pressure employed should be sufficient to compact the material in the mold to approximately one-half of its volume when introduced. Raw sawdust would have to be compressed at least twice that much.

It will be understood that the silicate treated sawdust, as well as the same treated with the bonding agent, will flow readily by gravity, and therefore may be readily fed through suitable conduits from one part to another of the apparatus employed. The molded article produced with this improved material is a hard, solid, dense and form-retaining mass or cake, and need not be subjected to a drying operation to improve these qualities. However, it is found that ageing at room temperature will cure the bond in about four hours. The impregnation of the particles of the sawdust with sodium silicate renders the article wholly or partially water-proof depending on the wood source and percentage of silicate used. This waterproofing is further increased by the bonding agent which covers the particles. Furthermore the product is oilproof and strongly fire retardant. Unlike wood, the product is not subject to warping as it ages or when subjected to moisture.

The method of this invention may be carried out with widely varying apparatus, but, for the purpose of illustration, I have shown in the accompanying drawings a diagrammatic flow chart. The raw sawdust of uniform particle size is fed from a hopper 1 to a hot air drier 2 having therein an agitator 3, wherein it is dried while agitated. From the drier 2 it is fed to a mixer 4 wherein the hardening liquid is introduced through an inlet 5, while said material is agitated by an agitator 6. The granular material, impregnated with the hardening agent, is delivered from the mixer 4 to a hot air drier 7 having an agitator 8, so that the material is agitated as it is dried. The dried and hardened material is delivered from the drier to a second mixer 9 having therein an agitator 10 and there the liquid bonding agent is sprayed on the material by a sprayer 11. The material is then delivered from the mixer either directly to the mold or to a hopper 12 from which it is fed through a passage 13 to the mold. Any suitable form of mold may be used for the molding of the article, but, in practice, I preferably utilize, where possible, a mold in the form of an open ended die cavity into which operate upper and lower punches. The drawing shows for the purpose of illustration a moving table 14 having therein die cavities 15 adapted, through step by step movement to be brought into registration with vertically alined upper and lower punches 16 and 17 respectively. As each cavity passes the passage 13 leading from the hopper 12, the treated sawdust composition fills the cavity 15 and, when the cavity is moved by movement of the table into alinement with the punches 16 and 17, these punches are brought together within such die cavity to pressure mold the sawdust composition therein. Subsequent step by step movement of the cavity brings the molded articles into position to be removed from the die cavities in succession. This form of molding die works very satisfactorily for small parts, but it is to be understood that the present invention is not limited to this particular type of pressure molding as any appropriate pressure molding apparatus may be employed in this connection.

I have hereinbefore described the pressure molding of sawdust in accordance with this invention. In practice, I may use sawdust in combination with wood shavings, or shavings alone, without departing from the invention and the claims are to be so understood.

The foregoing detailed description sets forth the invention in its preferred practical form, but the invention is to be understood as fully commensurate with the appended claim.

Having thus fully described the invention, what I claim as new and desire to secure by Letters Patent is:

Method of pressure molding articles from sawdust which comprises: impregnating raw sawdust with an aqueous sodium silicate hardening solution in an amount wherein the percentage of solids to be deposited by the hardening solution does not exceed 60% by weight of the end product article, then drying the thus impregnated sawdust to dry the individual particles thereof and convert them into permanently hard weighted and readily flowable discrete particles, thereafter applying to the thus treated hardened and dried particles a liquid bonding agent capable of forming a permanent bond with the deposited solids of the said hardening solution to form on said discrete particles a coating over them individually without making them tacky, thereafter introducing the hardening and coated particles into a mold chamber and subjecting them therein to pressure to compact them and cause the bonding agent to permanently bond the hardened particles together in the mold chamber and thus form a permanently hard non-compressible end product.

SIDNEY O. BARNSTEAD.

REFERENCES CITED

The following references are of record in the file of this patent:

UNITED STATES PATENTS

| Number | Name | Date |
|---|---|---|
| 1,168,831 | Skalla | Jan. 18, 1916 |
| 1,807,905 | Fischer | June 2, 1931 |